(12) United States Patent
Meney et al.

(10) Patent No.: US 11,627,774 B2
(45) Date of Patent: Apr. 18, 2023

(54) INTERFACE FOR CONNECTING A MOBILE SUPPORT AND AN OPTICAL DEVICE, ASSOCIATED SYSTEM

(71) Applicant: WILCO INTERNATIONAL, La Seyne-sur-Mer (FR)

(72) Inventors: Dorian Meney, La Seyne-sur-Mer (FR); Cédric Jambilloux, La Seyne-sur-Mer (FR); Marc Renard, La Seyne-sur-Mer (FR); Jean-Marc Wilhelm, La Seyne-sur-Mer (FR)

(73) Assignee: WILCO INTERNATIONAL, La Seyne-sur-Mer (FR)

( * ) Notice: Subject to any disclaimer, the term of this patent is extended or adjusted under 35 U.S.C. 154(b) by 78 days.

(21) Appl. No.: 16/972,666

(22) PCT Filed: Jun. 7, 2019

(86) PCT No.: PCT/FR2019/051387
§ 371 (c)(1),
(2) Date: Dec. 7, 2020

(87) PCT Pub. No.: WO2019/234373
PCT Pub. Date: Dec. 12, 2019

(65) Prior Publication Data
US 2021/0244120 A1    Aug. 12, 2021

(30) Foreign Application Priority Data

Jun. 7, 2018    (FR) ........................................ 1854986

(51) Int. Cl.
*A42B 3/04*    (2006.01)
*F16M 13/04*    (2006.01)
(Continued)

(52) U.S. Cl.
CPC ............. *A42B 3/042* (2013.01); *F16M 11/02* (2013.01); *F16M 13/04* (2013.01);
(Continued)

(58) Field of Classification Search
CPC ........ A42B 3/042; F16M 11/02; F16M 13/04; F16M 11/04; F16M 13/00; F16M 11/041; G02B 23/125; G02B 23/16; G02B 23/18
See application file for complete search history.

(56) References Cited

U.S. PATENT DOCUMENTS 2,271,952 A    2/1942    Raus
7,185,862 B1 *    3/2007    Yang .................... F16M 11/041
                                                                    396/428
(Continued)

FOREIGN PATENT DOCUMENTS

GB              2412837 A  * 10/2005    ............... A42B 3/04
WO    WO-2019119070 A1  *  6/2019    ............. A42B 3/042

OTHER PUBLICATIONS

Wilcox industries "Modular By Design" product catalog 2017 for night vision mounting systems. (Year: 2017).*
(Continued)

*Primary Examiner* — Terrell L McKinnon
*Assistant Examiner* — Ding Y Tan
(74) *Attorney, Agent, or Firm* — Buchanan Ingersoll & Rooney PC (57) ABSTRACT

The invention relates to an interface for connecting an optical device and a mobile support which cooperates securely with an imprinted element, the interface having a base arranged to be inserted into the imprinted element, the base being a hollow body. The base accommodates mechanical play compensating structures which are movably
(Continued)

mounted within the hollow body so as to project and are arranged in order to bear against a wall of the imprinted element.

10 Claims, 7 Drawing Sheets

(51) Int. Cl.
*F16M 11/02* (2006.01)
*G02B 23/12* (2006.01)
*G02B 23/16* (2006.01)
*F16M 11/04* (2006.01)
*F16M 13/00* (2006.01)

(52) U.S. Cl.
CPC .......... *G02B 23/125* (2013.01); *F16M 11/04* (2013.01); *F16M 13/00* (2013.01); *G02B 23/16* (2013.01)

(56) References Cited

U.S. PATENT DOCUMENTS

| | | | |
|---|---|---|---|
| 9,775,395 B2* | 10/2017 | Teetzel | A42B 3/042 |
| 9,781,963 B1* | 10/2017 | Celona | A42B 3/223 |
| 2010/0299814 A1* | 12/2010 | Celona | A42B 3/04 2/422 |
| 2011/0145981 A1* | 6/2011 | Teetzel | G02B 23/125 2/422 |
| 2013/0083391 A1* | 4/2013 | Teetzel | G02B 23/18 359/409 |
| 2014/0084120 A1* | 3/2014 | Solinsky | A42B 3/04 248/227.1 |
| 2014/0245523 A1* | 9/2014 | Teetzel | G02B 23/125 2/422 |
| 2015/0002930 A1* | 1/2015 | Teetzel | G02B 23/18 359/409 |
| 2015/0253563 A1* | 9/2015 | DiCarlo | G02B 23/18 403/322.4 |
| 2018/0206577 A1* | 7/2018 | Dextraze | A42B 3/04 |
| 2019/0008227 A1* | 1/2019 | Vilone | A45F 5/02 |
| 2019/0014846 A1* | 1/2019 | Teetzel | A42B 3/04 |
| 2019/0208854 A1* | 7/2019 | Teetzel | A42B 3/042 |
| 2020/0000167 A1* | 1/2020 | Noordzij | A42B 3/042 |

OTHER PUBLICATIONS

International Search Report (PCT/ISA/210) dated Nov. 22, 2019, by the European Patent Office as the International Searching Authority for International Application No. PCT/FR2019/051387.

Written Opinion (PCT/ISA/237) dated Nov. 22, 2019, by the European Patent Office as the International Searching Authority for International Application No. PCT/FR2019/051387.

* cited by examiner

INTERFACE FOR CONNECTING A MOBILE SUPPORT AND AN OPTICAL DEVICE, ASSOCIATED SYSTEM

BACKGROUND

The invention relates to the field of interfaces for connecting a mobile support and an optical device. Such interfaces are used for all types of usage and, preferably but not limitatively, in connection with a mobile support in the form of a helmet for military personnel, called a "land protective helmet", "marine protective helmet" or "aviation protective helmet", and more particularly in order to ensure the functions of attaching an optical device so that a user of such a helmet can make use of said optical device on demand while in the field. Such equipment must be held as stably as possible in order not to hamper the user. By way of non-limitative example, such equipment in the form of night vision goggles (also known by the abbreviation "NVG"), attached to a protective helmet of any type, possibly by means of an optical support device of the "shroud" type, must remain absolutely settled and stable in front of the user's eyes even if the latter is moving or turns their head in different directions.

However, the invention should not be limited to this embodiment example alone and could be transposed to any mobile support in the form of head equipment, such as, non-limitatively, a military helmet, whether ballistic or not, law enforcement helmet, riot helmet and/or civilian helmet, a head harness, a face mask, or also any other mobile support arranged in order to surround part of the body of a subject, whether this subject is human or animal. Thus, within the meaning of the invention and throughout the document, by "mobile support" is meant any support or object arranged in order to surround part of the body of a subject, whether this subject is human or animal, said support not interfering with one or more displacements or movements of said subject. Moreover, the invention can be transposed to any optical device the position of which relative to the support must be kept stable over time.

In the remainder of the document, the invention will be described, preferably but not limitatively, for land helmet interfaces (also known as "helmet mounts" and "NVG Mounts") that make it possible to combine night vision goggles with a land helmet, also described as a "protective helmet", equipped with an optical support device of the "shroud" type or equivalent, also called an "imprinted element".

A land helmet interface consists of a micromechanical assembly that makes it possible to carry any type of optical device, such as for example night vision goggles, said optical device cooperating with or generally comprising said interface, such an interface cooperating with a land helmet possibly by means of an optical support device of the "shroud" type or equivalent, also called an "imprinted element".

Figure 1A:
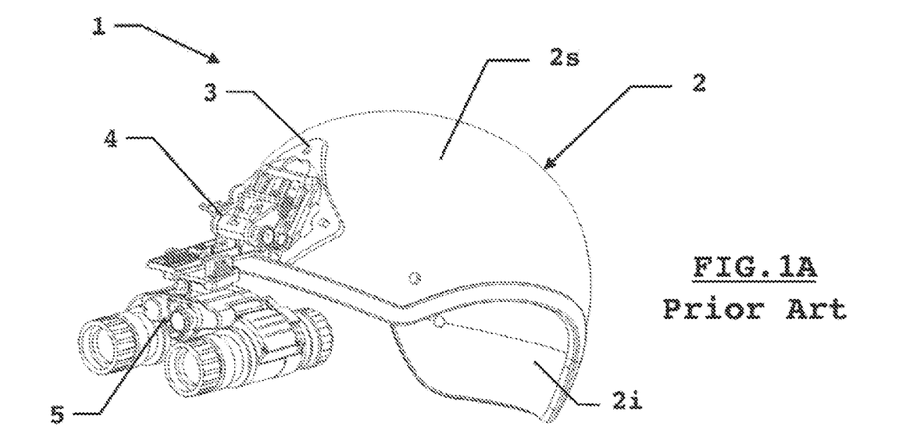
FIGS. 1A and 1B, described previously, illustrate an embodiment example of a known land helmet system equipped with a land helmet interface and an optical device, in active mode and passive mode respectively.
Figures 1B, 2A, 2B:
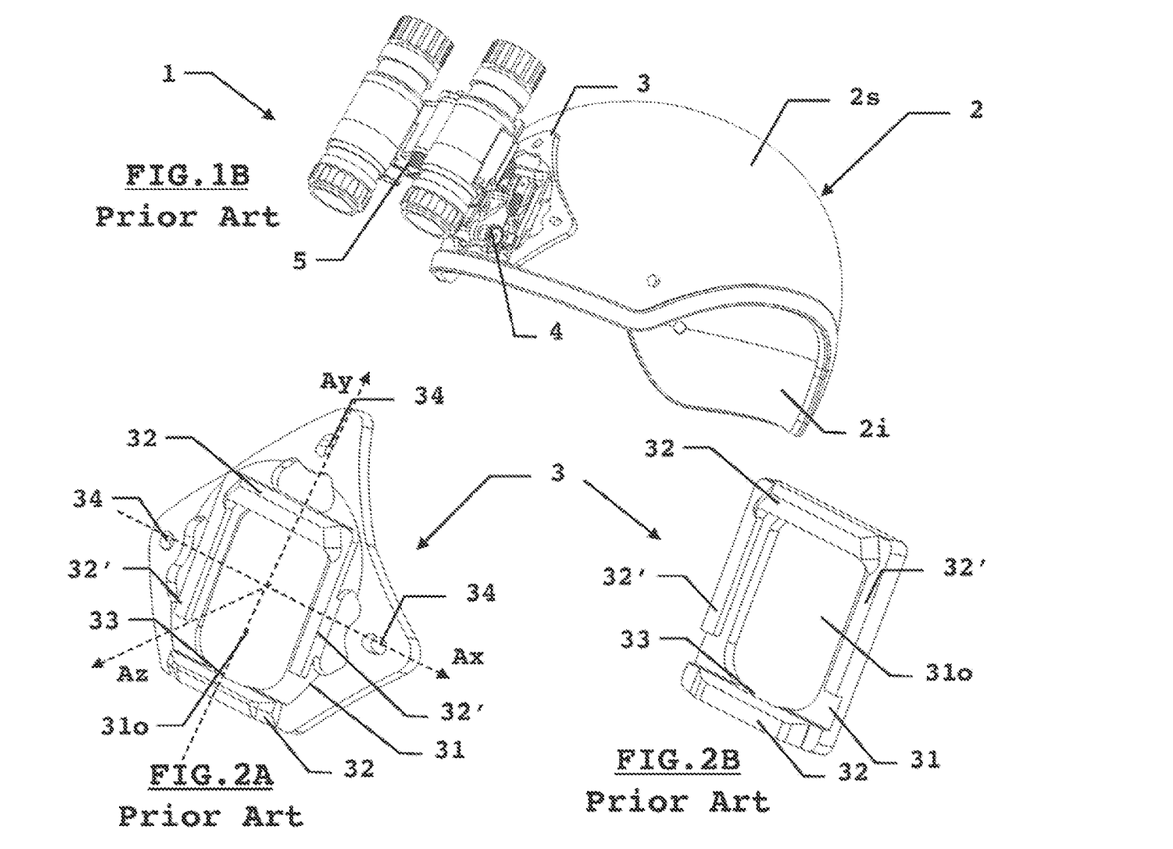
FIGS. 2A and 2B, described previously, illustrate, respectively, first and second embodiment examples of known imprinted elements intended to be attached to a mobile support, in this case a land helmet.

An example of a known land helmet system equipped with such a land helmet interface and an optical device is described in particular in connection with FIGS. 1A and 1B, said system being illustrated respectively in the operating (flip down) position, or active mode, i.e. the optical device can be used by a user, for example for night vision, and in contrast in the standby (flip up) position, or passive mode, in which said optical device is withdrawn, folded away in order not to interact with said user's view. Such a land helmet system makes it possible in particular to position said optical device and hold it in a suitable and predetermined position, i.e. opposite the eyes of a user of said system, while making it possible in particular for the user to keep their hands free, possibly in order to hold another accessory or item of equipment, such as, for example, a weapon. The user can thus make use simultaneously of the optical device and of another accessory or item of equipment which they may need.

A system 1 advantageously comprises a helmet 2, suitable for being or arranged to be worn, more particularly on the head, by a user. To this end, said helmet 2 has an interior surface 2i suitable for being in contact with the user's head and an exterior surface 2s. However, the invention should not be limited to this embodiment example alone. As a variant, the invention provides that any other support 2 that has the function of carrying an optical device while holding a predetermined position and is arranged in order to be worn by a user could be used instead. A system 1 also contains an optical device in the form of night vision goggles 5, wherein said night vision goggles cooperate with the exterior surface 2s of the helmet 2, equipped with an imprinted element or "shroud" optical support 3, by means of a suitable land helmet interface 4, also and commonly described as "NVG support".

According to an embodiment example of a known helmet system described in connection with FIGS. 1A and 1B, in order to ensure the reversible or temporary joining of the land helmet interface 4 and the land helmet 2 and to guarantee an optimum stabilization of the optical device, a known system 1 moreover contains an imprinted element 3, also known by the term "shroud", arranged in order to cooperate interdependently and reversibly with the land helmet interface 4. Such a cooperation between a land helmet interface 4 and an imprinted element 3 can be realized by a mechanical connection of the embedding type, preferably reversible. Such an embedding connection can be produced by any suitable attachment means, said land helmet interface 4 and imprinted element 3 being arranged together, in view of their structures and their shapes in particular, in order to ensure the assembly thereof. In accordance with the system described in connection with FIGS. 1A and 1B, such an imprinted element 3 cooperates interdependently and equally with the exterior surface 2s of said land helmet, in an embedding connection. Such an embedding connection can also be produced by any suitable attachment means, said helmet 2 and imprinted element 3 being arranged together in order to ensure the assembly thereof. As a variant, not represented in FIGS. 2A and 2B for simplification purposes, in particular in order to make it easier to assemble said system and to limit the manufacturing costs thereof, the imprinted element 3 can be integrated directly in the exterior surface 2s of said land helmet and with said land helmet can form one and the same physical entity.

FIGS. 2A and 2B diagrammatically illustrate two non-limitative examples of known imprinted elements. An imprinted element 3, in view of its structure, its shape and its dimensions, is advantageously arranged in order to receive a land helmet interface 4 and to hold the latter in a predetermined stable position. In order to do this, an imprinted element 3 advantageously comprises a body 31, wherein said body 31 can be constituted by any material arranged in order to be capable of ensuring that an interface 4 is held within it. Such a material can consist, for example, of aluminium, a plastic material or any other suitable polymer material. However, the invention should not be limited to the material or materials constituting the imprinted element 3. Said body 31 of the imprinted element 3 advantageously has the shape of a cradle frame, or even a ring, in order to receive the land helmet interface 4 and hold it in a predetermined stable position, said body then having a recess or a cavity 31o, the dimensions and shape of which are arranged together with those of the base of the land helmet interface 4. According to FIGS. 2A and 2B, such a body 31 contains two vertical stops 32 and two lateral stops 32 arranged or suitable for restricting and/or containing the movements of the land helmet interface 4 and for defining said frame. In order to guarantee the reduction, or even suppression, of any relative movement of the interface 4 of the base in the receiving cavity of the imprinted element, when said interface 4 is positioned within the imprinted element 3, the body 31 of the imprinted element 3 contains a bottom groove 33 and a top groove (not shown in the figures), respectively made within the vertical stops 32, said bottom groove 33 and top groove being arranged in order to receive, respectively, two parts of the interface 4 and to ensure the hold of said interface by interlocking. According to FIGS. 2A and 2B, the imprinted elements can have different suitable shapes as a function of the conditions of use or morphology of the mobile support, more particularly of the land helmet 2, on which the imprinted element is to be fixed. According to a first embodiment example described in connection with FIG. 2A, said body 31 of such an imprinted element 3 can advantageously contain attachment areas arranged in order to comprise one or more orifices or through holes 34, such orifices being arranged in order to receive means (not shown in the figures for simplification purposes) for attaching the imprinted element 3 to the land helmet 2, in the form for example of screws or hooks. As a variant, according to a second embodiment example described in connection with FIG. 2B, so as to simplify the manufacture of such an imprinted element 3, the latter can advantageously have a shape substantially equivalent to a frame, said imprinted element 3 then being able to be attached directly to the land helmet 2, or even integrated in said land helmet 2.

Figures 3, 4, 5:
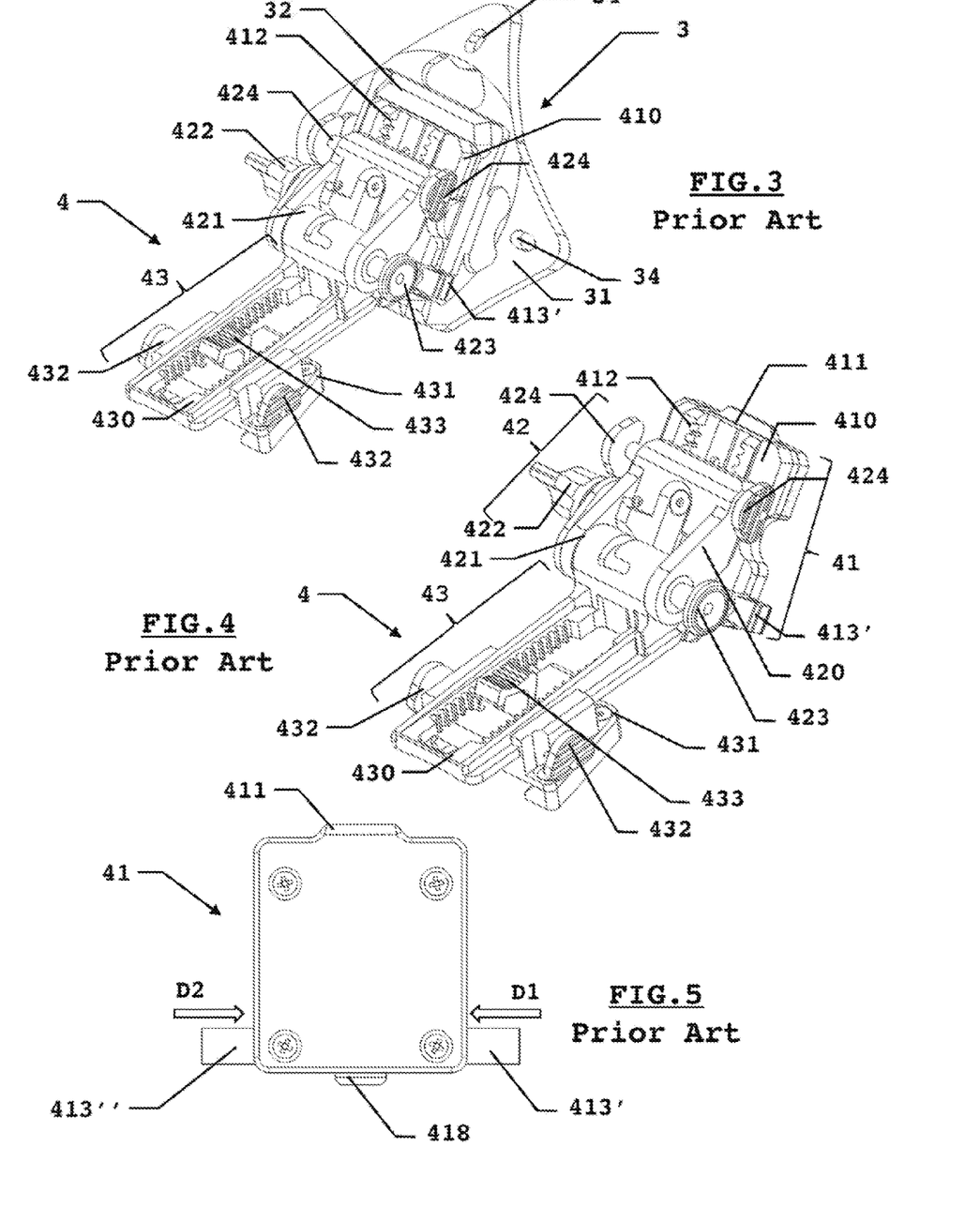
FIG. 3, described previously, shows an imprinted element/land helmet interface assembly of a known system comprising in particular a mobile support in the form of a land helmet.
FIG. 4, described previously, illustrates an embodiment example of an interface comprised within a known system comprising in particular a mobile support in the form of a land helmet.
FIG. 5, described previously, illustrates a diagrammatic rear view of the attachment means of an interface comprised within a known system comprising in particular a mobile support in the form of a land helmet.
Figure 6A:
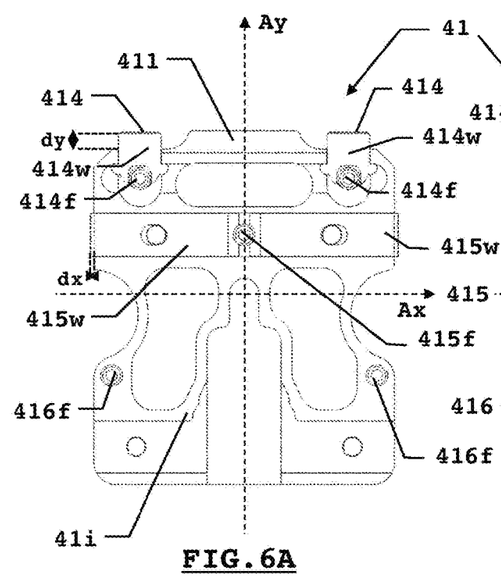
FIGS. 6A to 6D show different diagrammatic views of a non-limitative embodiment example of a base of an interface for connecting an optical device and a mobile support according to the invention.
Figure 6B:
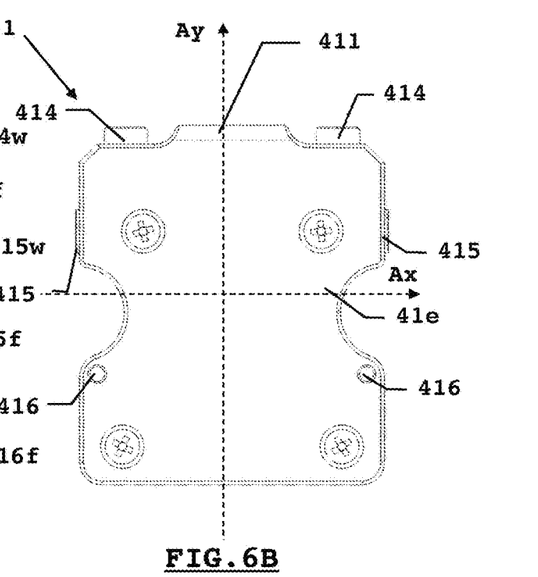
Figure 6C:
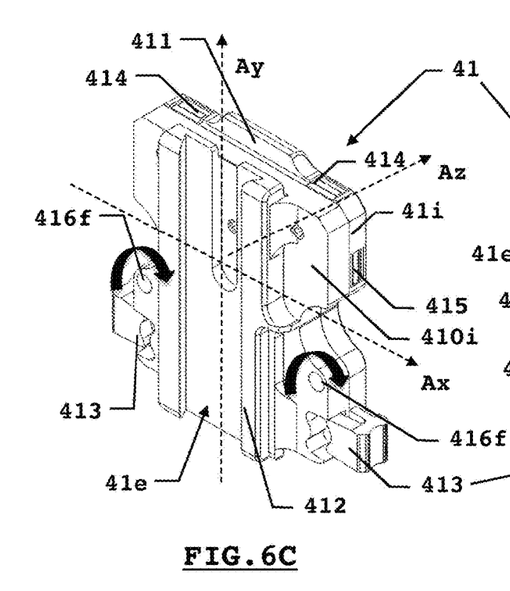
Figure 6D:
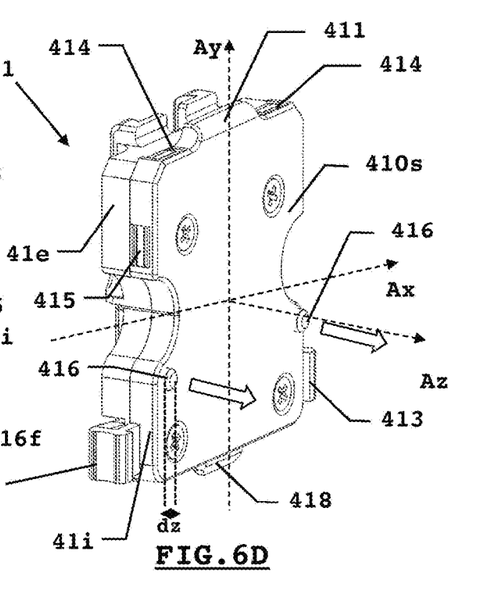

As already mentioned, in accordance with the embodiment example of a known system described in connection with FIGS. 1A and 1B, the attachment of an optical device, in the form for example of night vision goggles, to a mobile support such as a land helmet 2 is produced with the aid of a land helmet interface 4. As for FIGS. 3 to 5, they show different views of a non-limitative embodiment example of a known land helmet interface arranged in order to cooperate with an imprinted element 3 described previously. A land helmet interface 4, also known by the terms "Helmet Mount" and "NVG mount", contains different subassemblies.

First of all, said interface 4 contains a first rear subassembly mainly comprising a base mechanical part 41, such a base 41 being arranged, in view of its structure and its dimensions, in order to be inserted and positioned in the imprinted element 3 and thus to hold the land helmet interface 4, and therefore the optical device 5, in a fixed and/or stable predetermined position, despite any movements of the user wearing the land helmet 2 or more generally the movements or trajectories of the mobile support. In order to do this, the base 41 and the imprinted element 3 are arranged together, such that all or part of the base 41 can be integrated in the cavity made in the imprinted element 3. Furthermore, the base 41 of the land helmet interface 4 contains a part in the form of a peg 411, said peg being arranged, in view of its structure and its dimensions, in order to be inserted, generally firstly during the assembly, more particularly during the embedding phase, of the land helmet interface 4, within a top groove (not shown in the figures) made in the upper part, more particularly the upper vertical stop 32 of the imprinted element 3, and to ensure the hold thereof by interlocking. Said base 41 moreover contains means for locking the land helmet interface 4, comprising, according to FIG. 5, an actuator mounted in a mobile manner in the form of a latch 418. Said latch is advantageously arranged, in view of its structure and its dimensions, in order to be inserted in the bottom groove 33 of the imprinted element 3. The combined insertion of the peg 411 and the latch 418 ensures that the land helmet interface 4 is held in a predetermined position within the imprinted element 3. The means for locking the land helmet interface 4 moreover contain a locking and/or release button mounted in a translationally mobile manner, the protruding parts 413' and 413" of which are apparent in FIG. 5, which, when it is actuated in a first direction D1, drives the actuation, i.e. the upward movement, continuously, of the latch 418. In order to lock the position of the land helmet interface 4 within the imprinted element 3 again, the locking and/or release button must be actuated in a second direction D2, such that it then drives the actuation in the other direction, i.e. the downward movement, of the latch 418 and the simultaneous exit of the protruding part 413' of the locking/release button.

Then, said interface 4 contains a second central subassembly 42 comprising in particular a pivot axis 421 making it possible to drive the optical device 5, in the form of night vision goggles for example, in rotation and/or to tilt it, from a horizontal operating position, previously descry bed as "active mode", to a raised standby position, previously described as "passive mode". The second central subassembly 42 moreover comprises a first actuator button 423, making it possible, when said first button 423 is pressed or actuated, to carry out the positioning of the goggles in the standby position (also known by the term "flip up") or passive mode, or also to move them downwards into the operating position or active mode (also known by the term "flip down"). Such a second subassembly 42 comprises second actuator buttons 424, wherein simultaneously pressing on the second buttons 424 causes the displacement of said second subassembly 42 and makes it possible to adjust the height of the optical axis of the interface 4/optical device assembly to the level of the eyes of a user of the system. Said second subassembly 42 finally comprises a lever 422, the actuation of which drives a rotation of the second subassembly 42 and therefore makes it possible to adjust the inclination (also known by the term "tilt") of the optical device, more particularly the night vision goggles 5.

Finally, the land helmet interface 4 contains a third front subassembly 43, composed of a rail 430, a carriage 431 cooperating with said rail 430 in a mechanical connection of the slide type and a lever 433 cooperating interdependently with said carriage 431. Such a third subassembly 43 of the land helmet interface 4 is arranged in order to make it possible to lock and/or release the night vision goggles 5 automatically, by actuation of the lever 433. A third subassembly 43 moreover contains two actuator buttons 432 arranged in order to adjust the eye draw-tube, also described as "eye relief", i.e. the distance separating the exit pupil of the last lens from one of the eyes of a user, by actuating the two actuator buttons 432 simultaneously.

At the current time, there are numerous manufacturers designing and manufacturing their own imprinted elements and possibly land helmet interfaces suitable for being received and held respectively within said imprinted elements. In some cases, the land helmet interfaces are also only usable with only certain imprinted elements and vice versa. Furthermore, such imprinted elements are generally produced at lower costs and in large quantities: significant mechanical inequalities, also described as mechanical play, are then very often to be found between the different imprinted elements and the bases of the interfaces during the assembly thereof and once the bases of said interfaces have been attached to said imprinted elements. Some differences or mechanical inequalities can reach up to a millimetre in height and/or in width. Within the meaning of the invention and throughout the document, by "mechanical play" is meant a defined space between an imprinted element and a base of the land helmet interface, when these latter are assembled. Such mechanical play is present as soon as new systems are assembled, such systems containing a land helmet cooperating with an interface in order to connect a land helmet and an optical device, with the aid of an imprinted element. Such mechanical play generally originates from the shapes and various processes for manufacturing the imprinted elements by very numerous and different manufacturers. Significant mechanical play then exists between the land helmet interface and the imprinted element, not making it possible to ensure a sufficient hold of the land helmet interface in a substantially stable and predetermined position. In some cases, said mechanical play can cause a disengagement and a loss of the night vision goggles or more generally an optical device during the manoeuvres by personnel on a mission. In addition, said mechanical play can also generate friction or parasitic shocks between different parts of the system, more particularly between the land helmet interface and the imprinted element at the level of the mechanical connection, consequently leading to premature wear of these latter and finally to an increase of said mechanical play. At the current time, no land helmet interface or imprinted element, in view of their design, makes it possible to overcome this major drawback. In order to combat the mechanical play induced by the manufacturing inequalities, or also the wear of the land helmet interface and/or of the imprinted element, each user generally uses "in-house" techniques, colloquially referred to as "resourcefulness", at the risk of endangering a mission or damaging expensive equipment.

As previously stated, the means for locking the land helmet interface 4 moreover contain a locking and/or release button mounted in a translationally mobile manner, containing protruding parts 413' and 413", wherein successively actuating the protruding parts 413' and 413" respectively in the directions D1 and D2 drives the locking and/or the release of the land helmet interface vis-à-vis the imprinted element. In some cases, the protruding part 413" of the locking and/or release button can sometimes be actuated unintentionally in the direction D2, for example in the event of a lateral blow exerted on said locking button by a branch, by a temporary obstacle or also more generally by simply being pressed unintentionally by the user. Such an action then releases the land helmet interface and causes said interface, as well as the night vision goggles, to fall. Sometimes, such equipment is irreparably lost or destroyed. Such an unintentional release can sometimes have serious consequences for a mission, even as far as its abandonment in the event of loss of the optical devices.

SUMMARY

The invention makes it possible to respond to all or some of the drawbacks raised by the known solutions.

Among the numerous advantages provided by an interface for connecting an optical device and a mobile support, also described as interface for the connection of an optical device and a mobile support, according to the invention, it may be mentioned that it:

offers an interface that makes it possible to compensate for or support various instances of mechanical play between a land helmet interface and an imprinted element, the latter possibly being mounted on or integrated directly in a land helmet, such an interface per se becoming adaptable to any type of imprinted element, whatever the tolerances thereof linked to the dimensioning of the cavity intended to accommodate the base of the interface or the manufacturing process of said imprinted element;

proposes a system comprising a mobile support and an optical device, the hold of which in a predetermined stable position remains ensured, even if a user is particularly mobile during a mission, thanks to improved locking and/or release means.

Reciprocally, the invention provides an imprinted element suitable for connecting a mobile support and an optical device, wherein such an imprinted element cooperates interdependently with the base of an interface and is able to cooperate with bases of interfaces with shapes and/or dimensions that are not very strict.

To this end, an interface for connecting an optical device and a mobile support cooperating interdependently with an imprinted element is provided in particular, wherein said interface contains a base arranged in order to be inserted in the imprinted element, said base consisting of a hollow body. So as to compensate for one or more instances of mechanical play taking place between an interface and an imprinted element, possibly mounted on or integrated directly in a mobile support, such an interface being adaptable to any type of imprinted element, said base of an interface according to the invention contains means for compensating for mechanical play accommodated and mounted in a mobile manner within the hollow body so as to protrude and arranged in order to bear against a wall of the imprinted element.

Preferably but not limitatively, the compensating means of an interface according to the invention can bear against a wall of the imprinted element in a first predetermined direction.

According to an advantageous but non-limitative embodiment of an interface according to the invention, so as to optimize the rectifications of mechanical play, the compensating means can bear against a wall of the imprinted element in two predetermined directions.

As a variant or in addition, the compensating means can moreover bear against a wall of the imprinted element in three predetermined directions.

Preferably but not limitatively, the compensating means can comprise vertical, lateral and/or depth compensating means, actuated respectively by adjustment means.

As a variant or in addition, so as to prevent any unintentional release of said interface and to reduce the risks of the latter, or even the optical device, falling or being lost, such an interface can contain locking and/or release means arranged in order to require two distinct and simultaneous actions in order to ensure the triggering thereof.

According to a preferred but non-limitative embodiment example of an interface according to the invention, the locking and/or release means can comprise a cam oscillation system, wherein two actuator buttons cooperate with said cam oscillation system.

According to a second subject, the invention relates to an imprinted element for connecting an optical device and a mobile support cooperating interdependently with an interface comprising a base, wherein said imprinted element contains a body comprising a frame defining a cavity arranged in order to receive the base of said interface. So as to compensate for one or more instances of mechanical play taking place between an interface and an imprinted element, possibly mounted on or integrated directly in a mobile support, such an imprinted element being adaptable to any type of interface, said frame contains means for compensating for mechanical play accommodated and mounted in a mobile manner within said frame so as to protrude and arranged in order to bear against a wall of the base (41) of the interface.

Preferably but not limitatively, the compensating means of an imprinted element according to the invention can bear against a wall of the base of the interface in a first predetermined direction.

According to an advantageous but non-limitative embodiment, so as to optimize the rectifications of mechanical play, the compensating means of an imprinted element according to the invention can bear against a wall of the base of the interface in two predetermined directions.

As a variant or in addition, the compensating means of an imprinted element according to the invention can bear against a wall of the base of the interface in three predetermined directions.

Preferably but not limitatively, the compensating means of an imprinted element according to the invention can comprise vertical, lateral and/or depth compensating means.

According to a third subject, the invention relates to a system, comprising a mobile support, an imprinted element cooperating interdependently with said mobile support, an interface cooperating interdependently and reversibly with said imprinted element, an optical device cooperating interdependently and reversibly with said interface. Preferably but not limitatively, the interface of such a system is in accordance with the first subject of the invention.

BRIEF DESCRIPTION OF DRAWING FIGURES

Other characteristics and advantages will become more clearly apparent on reading the following description and on examining the figures accompanying it, in which.

DETAILED DESCRIPTION

Figure 10:
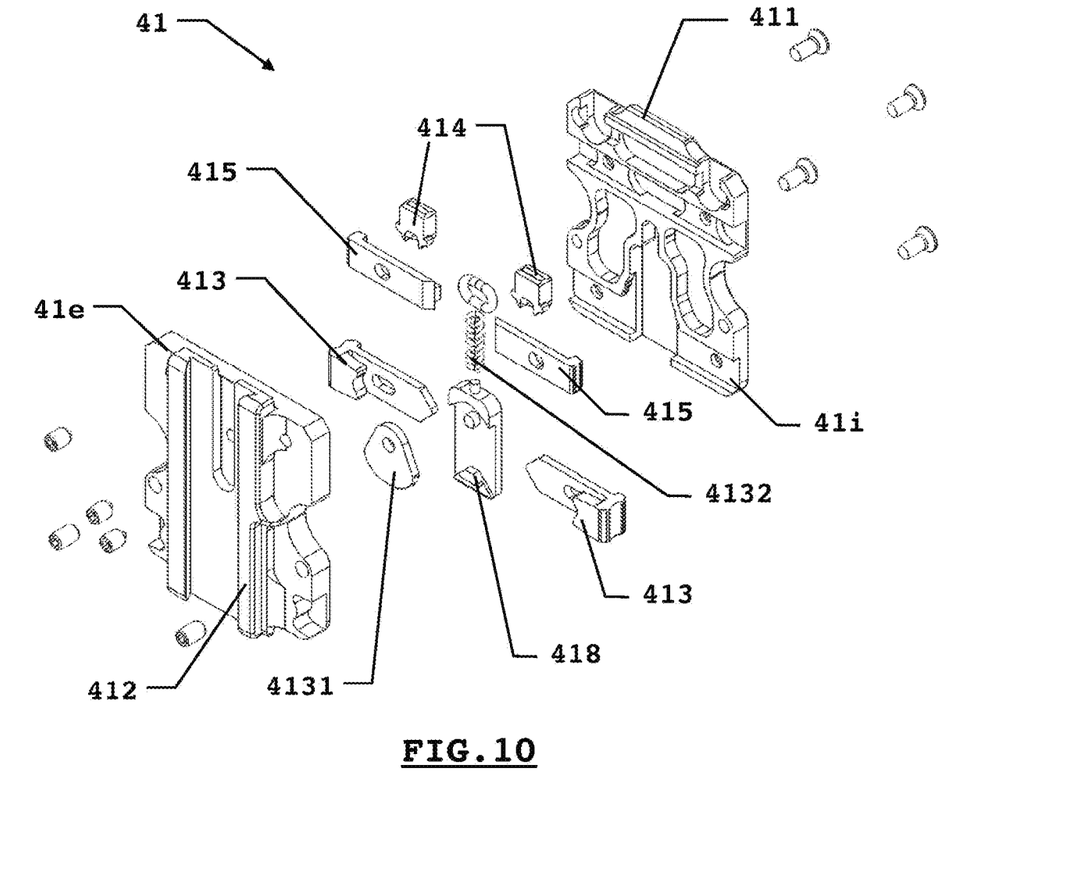
FIG. 10 illustrates an exploded view of a base of a non-limitative embodiment of an interface for an optical device according to the invention.

FIG. 10 illustrates an exploded view of a base of a non-limitative embodiment of an interface for an optical device according to the invention. As for FIGS. 6A to 6D, they show different diagrammatic views of a preferred embodiment example of the base of an interface for connecting an optical device and a mobile support according to the invention, wherein said optical device can, for example, consist of night vision goggles and said mobile support can, for example, consist of a land helmet. However, the invention should not be limited to this embodiment example alone. As a variant, the invention could be transposed to any other type of optical device, such as, by way of non-limitative example, a mobile camera or a thermal imaging camera, and/or any other type of mobile support arranged in order to surround part of the body of a subject, whether this subject is human or animal.

Figure 7:
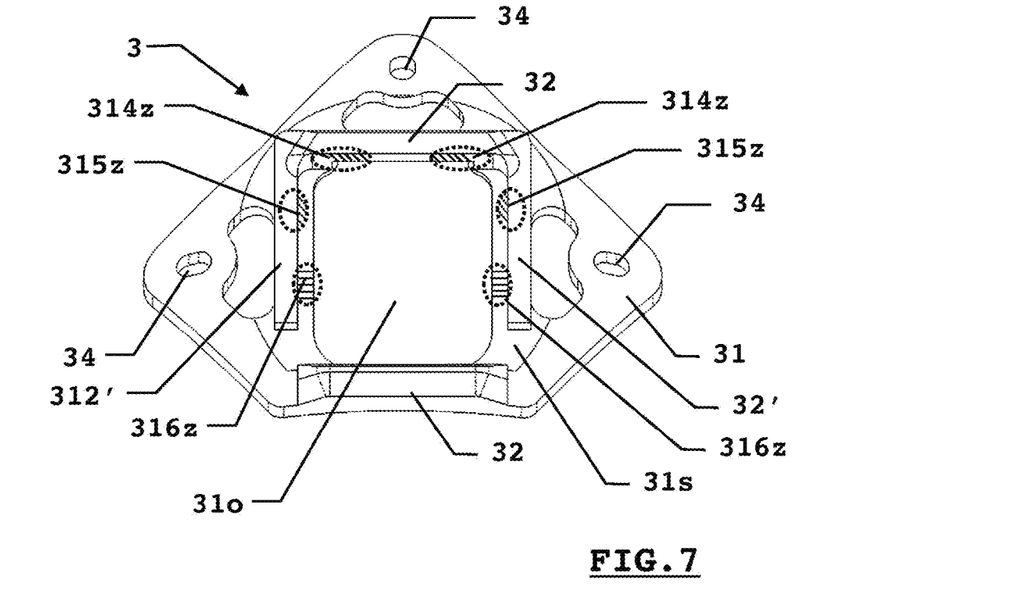
FIG. 7 illustrates a view of a non-limitative embodiment example of an imprinted element suitable for cooperating with an interface according to the invention.

An interface 4 is suitable for being integrated in a system, like the one described in connection with FIGS. 1A and 1B, and, as a consequence, for ensuring that night vision goggles 5 are assembled or cooperate with a land helmet 2 when they are in a predetermined position. So as to guarantee such an assembly, in the manner of the system described previously in connection with FIGS. 1A and 1B, said land helmet 2 can cooperate interdependently, i.e. in a connection of the embedding type, with an imprinted element 3. FIG. 7 shows a non-limitative example of an imprinted element suitable for cooperating with an interface 4 according to the invention. Such a cooperation between a land helmet 2 and an imprinted element 3 can be produced by any attachment means suitable for realizing said connection. As a variant, such an imprinted element 3 can be integrated directly in the land helmet 2 and, with such a helmet, form one and the same physical entity. In the manner of the known interfaces, more particularly the one described in connection with FIGS. 3 to 5, an interface 4 according to the invention contains a base 41 arranged in order to be inserted in the imprinted element 3. Within the meaning of the invention and throughout the document, by "base" is meant any object or any foundation on which the subassemblies of the interface 4 rest. Advantageously, the base 41 and the imprinted element 3, more particularly their structure and their respective dimensions, are arranged advantageously and together, such that all or part of the base 41 can be inserted, i.e. put in place, in the opening or the cavity 310 made or described by the imprinted element 3. According to a non-limitative preferred embodiment example, described in particular in connection with FIGS. 6A to 6D, so as to simplify the manufacture of an interface 4 according to the invention, the base 41 of the latter can have a shape substantially equivalent to a rectangular cuboid. Correspondingly, the cavity 310 made within the imprinted element can then have a similar shape, such as for example a shape substantially equivalent to a rectangular parallelepiped, the dimensions of said cavity then being suitable for receiving said base 41 in an adjusted manner. Said base 41 can be constituted by any material or set of materials suitable for responding to the mechanical or chemical constraints regarding environmental resistance, such as for example one or more plastic materials. In order to receive and surround various parts necessary during the micromechanical assembly of an interface 4 according to the invention, such as for example attachment means, the base 41 also consists of a hollow body. According to FIGS. 6A to 6D, advantageously, so as to simplify the manufacture of an interface 4 according to the invention, the hollow body of the base 41 can consist of two parts 41$i$ and 41$e$ sealed together in order to form one and the same physical entity. However, the invention should not be limited by the number of parts making up the base 41 or also the material constituting the base 41 or, more widely, said interface 4.

As stated previously, one of the aims of the invention is to compensate for any mechanical play due to the manufacturing vagaries, present between the base 41 of the interface 4 and the imprinted element 3 when these latter are assembled, even if reversibly. Finally, the invention makes it possible to augment the interoperability of the interface with a large number of imprinted elements from different manufacturers and thus takes on an almost universal nature. In order to do this, the base 41 of an interface 4 according to the invention contains and accommodates, within the hollow body, means 414,415,416 for compensating for mechanical play. Such means for compensating for mechanical play are generally independent of the locking and/or release means of the base on the imprinted element. As already mentioned, within the meaning of the invention and throughout the document, by "mechanical play" is meant the defined space between an imprinted element and a base of an interface, when these latter are assembled, in a given direction in space. Such a mechanical play is generally necessary for positioning the base 41 in the cavity 310 defined by the imprinted element 3. However, when the mechanical play existing between the base 41 and the imprinted element 3 becomes significant, a hold of the base, and more generally of the interface and the optical device, in a stable and predetermined position is no longer guaranteed, being able, in some cases, to cause the disengagement and the loss of the optical device, in the form for example of night vision goggles, or even, in other cases, a premature wear of said imprinted element 3 and interface 4.

In order to compensate for the mechanical play present between an interface 4 according to the invention and an imprinted element 3, the compensating means 414,415,416 of the base 41 of said interface 4 are mounted in a mobile manner so as to protrude from the hollow body and/or, when the interface 4 is not used, so as to be able to be withdrawn or retracted inside the hollow body. Still with the aim of rectifying the mechanical play present between an interface 4 according to the invention and the imprinted element 3, said compensating means 414,415,416 are arranged in order to bear, when they are actuated or active, against one of the walls of the body 31 of the imprinted element 3 defining the cavity 31$o$, such that said compensating means 414,415,416 hold the base 41 in a predetermined stable position within the cavity 310 made in the imprinted element 3, thus correcting any deviation between the geometries of the elements and therefore all relative movements or displacements of said elements. By way of non-limitative example, as described in connection with FIG. 7, said compensating means 414,415,416 of the base 41 of an interface 4 according to the invention can bear against one of the lateral stops 32', vertical stops 32 or also the upper surface 31$s$ of the body 31 of the imprinted element 3.

Figure 8A:
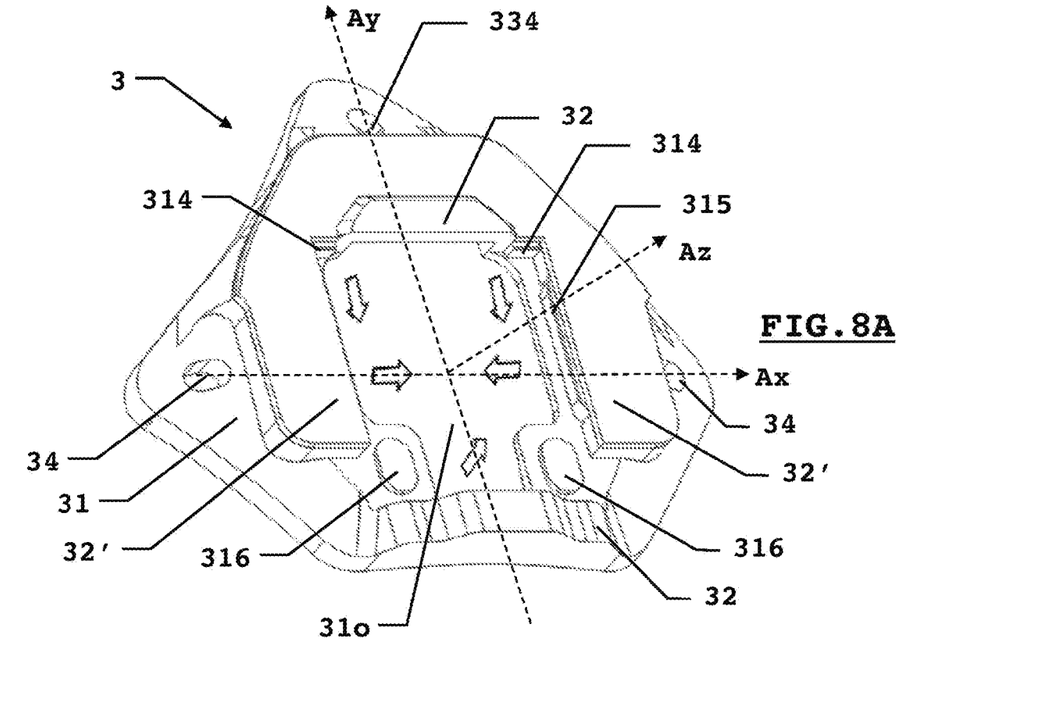
FIGS. 8A to 8D show different diagrammatic views of a non-limitative embodiment of an imprinted element according to the invention.

The invention provides that the compensating means 414,415,416 of the base 41 of an interface 4 according to the invention can compensate for the mechanical play present, simultaneously or independently, in different predetermined directions, more precisely three, in relation to a frame of reference or Cartesian coordinate system in three dimensions (Ax,Ay,Az), as described in particular in connection with FIG. 2A or 8A, two of the three dimensions defining a plane (Ax,Ay) substantially parallel to the plane described overall by the essentially flat structure of the imprinted element. According to a non-limitative embodiment of the base of an interface according to the invention described in connection with FIGS. 6A to 6D, the compensating means 414,415,416 of said base 41 can comprise vertical 414, horizontal 415 and/or depth 416 compensating means. Thus, advantageously but not limitatively, the compensating means 414 of the base 41 of said interface 4 can bear against a wall of the imprinted element 3 in a first predetermined direction, advantageously described as vertical, along a first vertical axis Ay. Thus, as described in connection with FIG. 7, said compensating means 414 are arranged in order each to bear 314$z$ against part of one of the vertical stops 32 of the imprinted element 3 and thus to prevent any relative displacement of the base 41 in the cavity 310 of the imprinted element along the first vertical axis Ay and to hold the position of the interface. As a variant or in addition, the compensating means 415 of the base 41 can also each bear against a wall of the imprinted element 3 in a second predetermined direction, advantageously described as lateral, along a second lateral axis Ax. Thus, as described in connection with FIG. 7, said compensating means 415 are arranged in order to bear against part of one of the lateral stops 32' of the imprinted element 3 and thus to prevent any relative displacement of the base 41 in the cavity 310 of the imprinted element along the second lateral axis Ax and to hold the position of the interface. Finally, as a variant or in addition, the compensating means 416 of the base 41 can bear against a wall of the imprinted element 3 in a third predetermined direction, advantageously described as depth, along a third axis Az. Thus, as described in connection with FIG. 7, said compensating means 416 are arranged in order to bear 316$z$ against part of the upper surface 31$s$ of the body 31 of the imprinted element 3 and thus to prevent any relative displacement of the base 41 in the cavity 310 of the imprinted element along the third axis Az and to hold the position of the interface, the peg 411 of the base 41 being gripped or pressed against the groove 32.

A preferred but non-limitative structural embodiment example of the compensating means 414,415,416 of an interface 4 for connecting an optical device and a mobile support 2 is now described, wherein said interface is in accordance with the invention presented in connection with FIGS. 6A to 6D. As stated previously, the compensating means 414,415,416 of said base 41 of an interface 4 according to the invention can comprise vertical 414, horizontal 415 and/or depth 416 compensating means.

According to FIGS. 6A to 6D, such vertical compensating means 414 contain one or more blocks 414$w$, advantageously two, accommodated within the hollow body, such blocks 414w being mounted in a mobile manner independently of one another within the hollow body of the base 41, such that each block 414w, the overrun distance or course dy of which is advantageously and independently adjustable, can protrude independently and bear against one of the parts of one of the vertical stops 32 of the imprinted element 3. In order to do this, the vertical compensating means 414 also comprise adjustment means 414f cooperating with said blocks 414w in a suitable mechanical connection, such that the movement or movements or more generally an actuation of said adjustment means 414f drive one or more translational movements of said blocks 414w. According to FIGS. 6A to 6D, such adjustment means 414f consist of adjustment screws, each block 414w being independently associated with its own adjustment screw. Each block 414w and each adjustment screw 414f cooperate for example in a mechanical connection of the "helical" type, such that a rotational movement of an adjustment screw 414f drives a translational movement of the block 414w. The threaded part of the adjustment screw 414f has a sufficient length in order to be able to adjust the overrun distance dy as a function of the mechanical play to be compensated for between the interface 4 and the imprinted element 3.

Analogously, according to FIGS. 6A to 6D, the horizontal compensating means 415 contain one or more blocks 415w, advantageously two, accommodated within the hollow body, such blocks 415w being mounted in a mobile manner jointly within the hollow body of the base 41, such that said blocks 415w, the overrun distance or course dx of which is advantageously adjustable, can protrude and bear against one of the parts of one of the lateral stops 32' of the imprinted element 3. In order to do this, the horizontal compensating means 415 also comprise adjustment means 415f cooperating with said blocks 415w in a suitable mechanical connection, such that the movement or more generally the actuation of said adjustment means 415f drives the simultaneous or joint translational movements of said blocks 415w. According to FIGS. 6A to 6D, such adjustment means 415f consist of an adjustment screw, said blocks 415w being jointly combined with the same adjustment screw 415f. Said blocks 415w and the adjustment screw 415f cooperate respectively in mechanical connections of the helical type, such that a rotational movement of said adjustment screw 415f drives the respective and joint translational movements of said block 415w. The threaded part of the adjustment screw 415f has a sufficient length in order to be able to adjust the overrun distance or course dx as a function of the mechanical play to be compensated for between the interface 4 and the imprinted element 3.

According to FIGS. 6A to 6D, the depth compensating means 416 contain one or more screws 416, advantageously two, accommodated within the hollow body, such screws 416 being mounted in a mobile manner independently of one another within the hollow body of the base 41, such that each screw 416, the overrun distance or course dz of which is advantageously and independently adjustable, can protrude independently and bear against part of the upper surface 31s of the body 31 of the imprinted element 3. The threaded part of the screws 416 has a sufficient length in order to be able to adjust the overrun distance dz as a function of the mechanical play to be compensated for between the interface 4 and the imprinted element 3.

In the manner of an interface according to the invention described previously, the invention provides an imprinted element suitable for connecting a mobile support and an optical device, wherein such an imprinted element cooperates interdependently with the base of an interface and is able to cooperate with bases of interfaces with shapes and/or dimensions that are not very strict. Finally, the invention makes it possible to augment the interoperability of the imprinted element with a large number of interfaces from different manufacturers and thus takes on an almost universal nature. FIGS. 8A to 8D show different diagrammatic views of a preferred embodiment example of an imprinted element for connecting an optical device and a mobile support according to the invention, wherein said optical device can, for example, consist of night vision goggles and said mobile support can, for example, consist of a land helmet.

According to FIG. 8A, the body 31, more particularly the frame of an imprinted element 3 according to the invention advantageously has hollow parts. Said hollow parts of the body 31 contain and accommodate means 314,315,316 for compensating for mechanical play.

In order to compensate for the mechanical play present between an interface 4 according to the invention and an imprinted element 3, the compensating means 314,315,316 of the body 31 of the imprinted element 3 are mounted in a mobile manner so as to protrude from the body 31 and, when the interface 4 is not used, so as to be able to be withdrawn or retracted inside the body 31. Still with the aim of rectifying the mechanical play present between an interface 4 according to the invention and the imprinted element 3, said compensating means 314,315,316 are arranged in order, when they are actuated or active, to bear against one of the walls of the base of the interface 4, such that said compensating means 314,315,316 hold the base 41 in a predetermined stable position within the cavity 310 made in the imprinted element 3, thus correcting any deviation between the geometries of the elements and therefore all relative movements or displacements of said elements.

The invention provides that the compensating means 314,315,316 of the body 31 of an imprinted element according to the invention can compensate for the mechanical play present, simultaneously or independently, in different predetermined directions, more precisely three, in relation to a frame of reference or Cartesian coordinate system in three dimensions (Ax,Ay,Az), as described in particular in connection with FIG. 8A, two of the three dimensions defining a plane (Ax,Ay) substantially parallel to the plane described overall by the essentially planar structure of the interface. According to a non-limitative embodiment of an imprinted element according to the invention described in connection with FIGS. 8A to 8D, the compensating means 314,315,316 of said body 31 can comprise vertical 314, horizontal 315 and/or depth 316 compensating means. Thus, advantageously but not limitatively, according to FIG. 8B, the compensating means 314 of the body 31 of said imprinted element can bear against a wall of the interface 4 in a first predetermined direction, advantageously described as vertical, along a first vertical axis Ay. As a variant or in addition, according to FIG. 8C, the compensating means 315 of the body 31 of said imprinted element can also each bear against a wall of the interface 4 in a second predetermined direction, advantageously described as lateral, along a second lateral axis Ax. Finally, as a variant or in addition, according to FIG. 8D, the compensating means 316 of the body 31 of said imprinted element can bear against a wall of the interface 4 in a third predetermined direction, advantageously described as depth, along a third axis Az.

A preferred but non-limitative structural embodiment example of the compensating means 314,315,316 of an imprinted element for connecting an optical device and a mobile support 2 is now described, wherein said imprinted element is in accordance with the invention presented in connection with FIGS. 8A to 8D. As stated previously, the compensating means 314,315,316 of the body 31 of an imprinted element 3 according to the invention can comprise vertical 314, horizontal 315 and/or depth 316 compensating means.

Figure 8B:
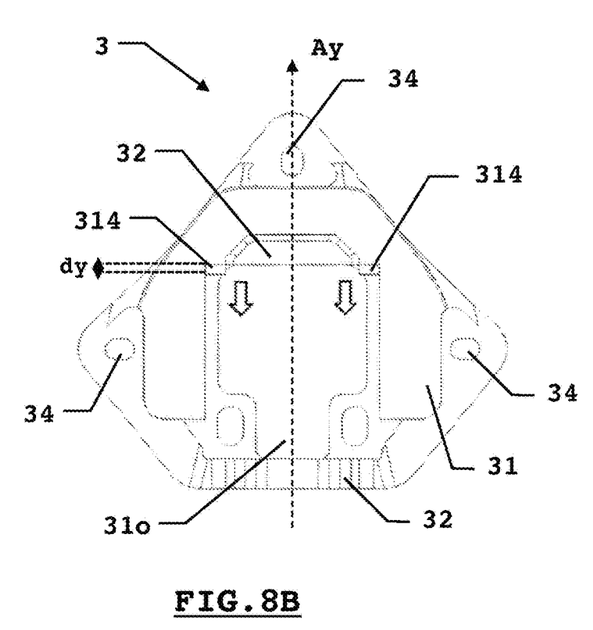

According to FIGS. 8A and 8B, such vertical compensating means 314 contain one or more blocks 314, advantageously two, accommodated within the body 31, more particularly within one of the advantageously hollow vertical stops 32, such blocks 314 being mounted in a mobile manner independently of one another within said vertical stop 32, such that each block 314, the overrun distance dy or course of which is advantageously and independently adjustable as a function of the mechanical play to be compensated for between the interface 4 and the imprinted element 3, can protrude independently and bear against one of the faces of the base 41 of the interface 4.

Figure 8C:
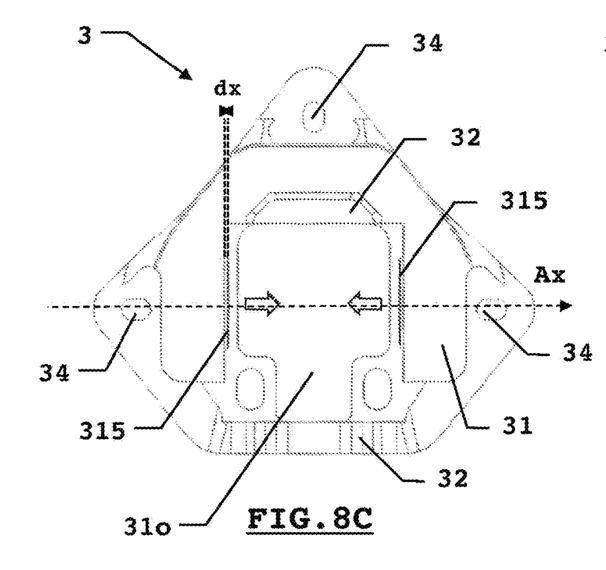

Analogously, according to FIGS. 8A and 8C, the horizontal compensating means 315 contain one or more blocks 315, advantageously two, accommodated within the body 31, more particularly and respectively within the advantageously hollow lateral stops 32' of the body 31, such blocks 315 being mounted in a mobile manner independently of one another within the lateral stops 32' of the body 31, such that each block 315, the overrun distance dx or course of which is advantageously and independently adjustable as a function of the mechanical play to be compensated for between the interface 4 and the imprinted element 3, can protrude independently and bear against one of the faces of the base 41 of the interface 4.

Figure 8D:
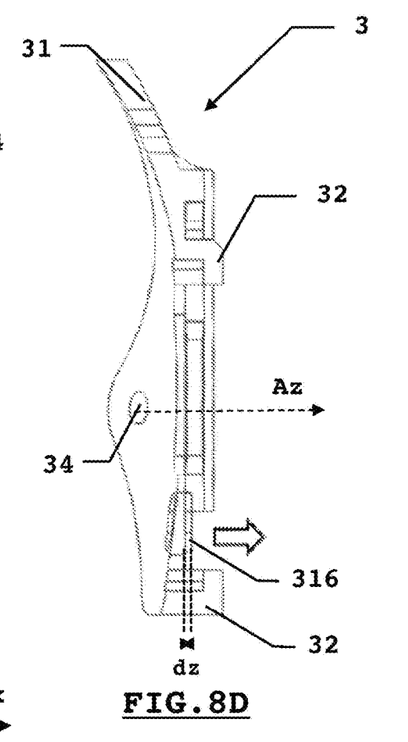

Analogously, according to FIGS. 8A and 8D, the depth compensating means 316 contain one or more blocks 316, advantageously two, accommodated within the body 31, more particularly and respectively at the level of the cavity 310 made in said body 31, such blocks 316 being mounted in a mobile manner independently of one another within said body 31, such that each block 316, the overrun distance dz or course of which is advantageously and independently adjustable as a function of the mechanical play to be compensated for between the interface 4 and the imprinted element 3, can protrude independently and bear against one of the faces of the base 41 of the interface 4.

As already mentioned, another aim of the invention is to prevent any unintentional release of said interface and to reduce the risks of the latter, or even the optical device, falling or being lost. In order to do this, an interface 4 for connecting an optical device 5 and a mobile support 2, via an imprinted element 3, can contain locking and/or release means arranged in order to require two distinct and simultaneous actions or operations by a user of the mobile support 2 in order to ensure the actuation thereof. Of course, the use of such locking and/or release means requiring the use of two joint operations could possibly, as a variant, be transposed to any known type of interface. The use of locking and/or release means with two operations in order to trigger the disengagement of the interface from the imprinted element proves to be particularly ingenious, since a lateral shock or an involuntary pressing cannot cause the actuation of said locking and/or release means, because such a shock or involuntary pressing is generally not very likely to be able to reproduce two distinct and joint actions. In this way, a dual control unit can be established, which requires two joint or simultaneous actions by a user of a system in connection with which an interface 4 for connecting an optical device 5 and a mobile support 2 according to the invention is used, in order to trigger the release and/or the locking of the interface on the imprinted element.

FIGS. 9A to 9D show different diagrammatic views of a non-limitative embodiment example of the base 41 of an interface for connecting an optical device 5 and a mobile support 2 according to the invention, highlighting the operation of a non-limitative embodiment example of locking and/or release means 413,418,4131,4132 of the base of said interface. Such locking and/or release means of the base 41 of said interface 4 can advantageously but not limitatively comprise a cam oscillation system.

According to FIGS. 9A to 9D, in the manner of the known interfaces, the locking and/or release means contain a latch 418. Said latch 418 is advantageously arranged, in view of its structure and its dimensions, in order to be inserted, when it protrudes, in the groove 32 made in an imprinted element 3 and thus to ensure the engagement of the base 41 of the interface 4 in said imprinted element 3. Moreover, said locking and/or release means advantageously comprise two actuator buttons 413 accommodated within the hollow body of the base 41, mounted in a mobile manner so as to protrude and arranged in order to actuate a cam 4131, itself mounted in a mobile manner, said cam 4131 cooperating with said latch 418 in a mechanical connection of the pivot type along an axis perpendicular to the axis of the course of the latch 418, since it is mounted rotationally on said latch, and finally to cause the engagement or the disengagement of the latch 418 in the bottom groove 33. In order to do this, the locking and/or release means contain a cam 4131 cooperating with said latch 418. Within the meaning of the invention, by "cam" is meant any part or any mechanical unit making it possible to guide the displacement of the latch 418. The locking and/or release means thus comprise a coil spring 4132, cooperating interdependently with the latch 418, arranged in order to exert a compressive force and finally to drive a translational movement of the latch, when said spring 4132 is compressed under the action and transmission of the effort produced by the cam 4131. The cam 4131 moreover cooperates with the actuator buttons 413, wherein the actuation of said button or buttons consists of a translational movement then transmitted to the cam 4131.

Figures 9A, 9B:
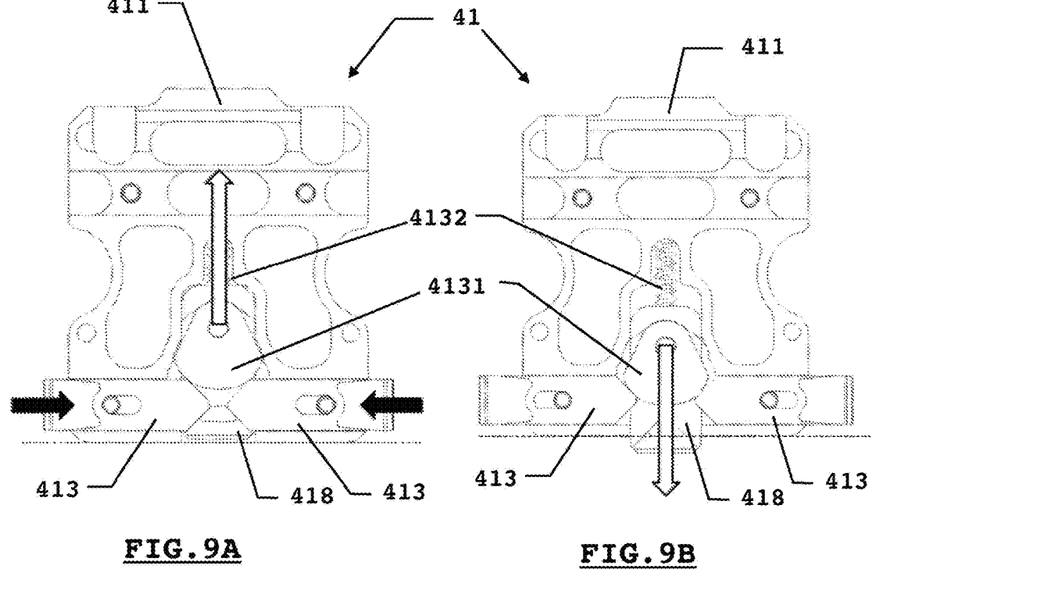
FIGS. 9A to 9D show different diagrammatic views of a non-limitative embodiment example of a base of an interface for connecting an optical device and a mobile support according to the invention, highlighting the operation of the locking and/or release means of said interface.

FIG. 9A shows a view of the base 41 of the interface 4 comprising locking and/or release means in active mode, i.e. when the latch 418 is disengaged from the bottom groove 33 of the imprinted element 3. In fact, simultaneously pressing on the two actuator buttons 413 (situation represented by the two black arrows in FIG. 9A) drives a vertical translational movement of the cam 4131, transmitting an effort to the coil spring 4132 which compresses (situation represented by a black-line arrow in FIG. 9A) and finally makes a translational movement, more particularly the upward movement, of the latch 418 possible. The upward movement of the latch 418 drives its disengagement from the groove and finally the uncoupling of the base of the interface from the imprinted element 3.

Figures 9C, 9D:
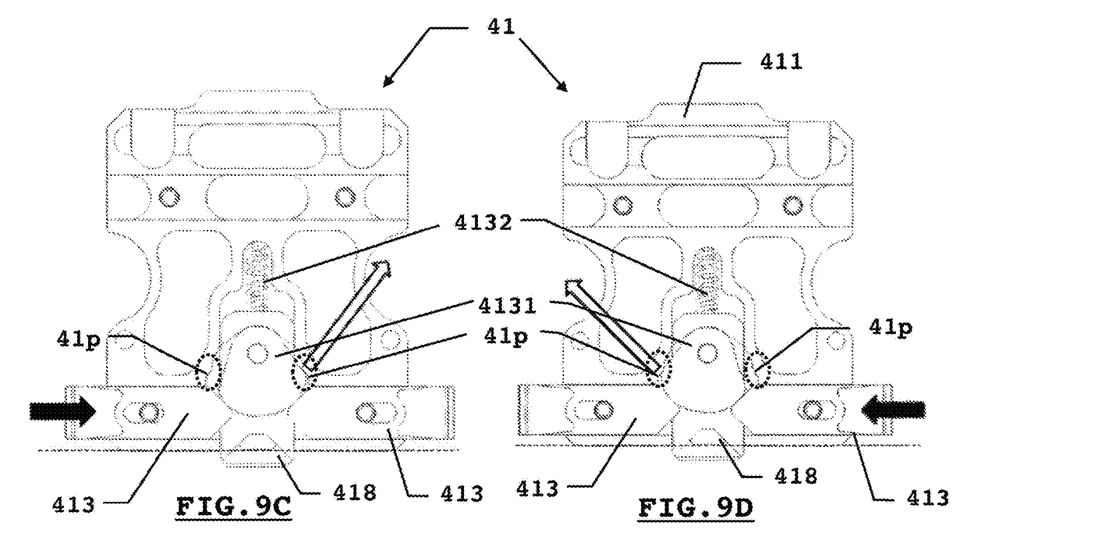

FIG. 9B diagrammatically illustrates a view of the base 41 of the interface 4 comprising locking and/or release means in inactive mode, i.e. when the latch 418 is engaged in the bottom groove 33 of the imprinted element 3. In fact, the absence of pressing on the two actuator buttons 413 does not drive any movement of the cam 4131: the latch 418 thus remains in a stable position, advantageously held engaged in the bottom groove 33. FIGS. 9C and 9D diagrammatically illustrate views of the base 41 of the interface 4 comprising locking and/or release means containing two actuator buttons 413, wherein a single one of the actuator buttons 413 is pushed by a user, respectively to the left or to the right, and consequently the latch 418 is then held engaged in the bottom groove 33 of the imprinted element 3. According to FIGS. 9C and 9D, pressing on one of the two actuator buttons 413 once drives a rotational movement of the cam 4131 against a shoulder 41$p$ of the base 41, blocking any vertical translational displacement upwards of the cam and acting as a barrier for the course of the latch 418.

Finally, one of the aims of the invention consists of using an interface according to the invention described previously and arranged in order to connect an optical device in the form of night vision goggles and a mobile support in the form of a helmet for military personnel maneuvering on the ground, called a land helmet. In order to do this, the invention moreover relates to a system 1. As described previously, such a system 1 comprises a mobile support 2, an imprinted element 3 cooperating interdependently with said mobile support 2, an interface 4 cooperating interdependently and reversibly with said imprinted element 3, comprising an optical device 5 cooperating interdependently and reversibly with said interface 4. Advantageously but not limitatively, the interface 4 is in accordance with the invention.

The invention has been described at the time of its use in connection with a mobile support in the form of a helmet for military personnel maneuvering in a land, marine or aviation environment, called "land protective helmet", "marine protective helmet" or "aviation protective helmet" respectively, and more particularly in order to ensure functions of attaching an optical device, in the form of night vision goggles attached to such a land helmet, so that a user of such a helmet can make use of said optical device on demand while in the field. Such equipment 5 must be held with a large degree of stability in order not to destabilize the use. It can also be used for any mobile support in the form of head equipment, such as, non-limitatively, a military helmet, whether ballistic or not, law enforcement helmet, riot helmet and/or civilian helmet, a head harness, a face mask, or also any other mobile support arranged in order to surround part of the body of a subject, whether this subject is human or animal. Moreover, the invention can also be used for any optical device the position of which relative to the support must be kept stable over time. The invention should not be limited to the application in which the system 1 according to the invention is used.

Moreover, a system according to the invention can comprise other accessories, in order in particular, by way of non-limitative examples, to ensure communication with the outside world or to protect the user of said system. Such accessories can be chosen, by way of non-limitative examples, from one or more means for transmitting and/or receiving communication, such as a microphone or earphone.

The invention claimed is:

1. Interface for connecting an optical device and a mobile support cooperating interdependently with an imprinted element of a head equipment, said interface containing a base arranged in order to be inserted in the imprinted element, said base comprising a hollow body, wherein said base contains a first protrusion accommodated and mounted in a mobile manner within the hollow body so as to adjustably protrude in a first predetermined direction and arranged in order to bear against a first wall of the imprinted element and a second protrusion accommodated and mounted in a mobile manner within the hollow body so as to adjustably protrude in a second predetermined direction and arranged in order to bear against a second wall of the imprinted element, the first predetermined direction being perpendicular to the second predetermined direction, the first and second protrusions being independently adjustable.

2. Interface according to claim 1, further comprising a third protrusion accommodated and mounted in a mobile manner within the hollow body so as to adjustably protrude in a third predetermined direction and arranged in order to bear against a third wall of the imprinted element, the third predetermined direction being perpendicular to the first predetermined direction and the second predetermined direction, the first, second and third protrusions being independently adjustable.

3. Interface according to claim 1, wherein the first and second protrusions comprise vertical, lateral and/or depth compensating means, respectively actuated by adjustment means.

4. Interface according to claim 1, containing locking and/or release means arranged in order to require two distinct and simultaneous actions in order to ensure triggering thereof.

5. Interface according to claim 4, wherein the locking and/or release means comprise a cam oscillation system and two actuator buttons cooperating with said cam oscillation system.

6. Imprinted element of a head equipment for connecting an optical device and a mobile support cooperating interdependently with an interface comprising a base, said imprinted element containing a body comprising a frame defining a cavity arranged in order to receive the base of said interface, wherein said frame contains a first protrusion accommodated and mounted in a mobile manner within said frame so as to adjustably protrude in a first predetermined direction and arranged in order to bear against a first wall of the base of the interface and a second protrusion accommodated and mounted in a mobile manner within said frame so as to adjustably protrude in a second predetermined direction and arranged in order to bear against a second wall of the base of the interface, the first predetermined direction being perpendicular to the second predetermined direction, the first and second protrusions being independently adjustable.

7. Imprinted element according to claim 6, further comprising a third protrusion accommodated and mounted in a mobile manner within said frame so as to adjustably protrude in a third predetermined direction and arranged in order to bear against a third wall of the base of the interface, the third predetermined direction being perpendicular to the first predetermined direction and the second predetermined direction, the first, second and third protrusions being independently adjustable.

8. Imprinted element according to claim 6, wherein the first and second protrusions comprise vertical, lateral and/or depth compensating means.

9. System, comprising a head equipment, an imprinted element cooperating interdependently with said head equipment, an interface cooperating interdependently and reversibly with said imprinted element, an optical device cooperating interdependently and reversibly with said interface, wherein the interface is in accordance with claim 1.

10. Interface for connecting an optical device and a mobile support cooperating interdependently with an imprinted element of a head equipment, said interface containing a base arranged in order to be inserted in the imprinted element, said base comprising a hollow body, wherein said base contains locking and/or release means arranged in order to require two distinct and simultaneous actions in order to ensure triggering thereof, and the locking and/or release means comprise a cam oscillation system and two actuator buttons cooperating with said cam oscillation system.

\* \* \* \* \*